M. SMITH.
SCYTHE-SNATH FASTENING.

No. 189,275. Patented April 3, 1877.

WITNESSES:
W. W. Hollingsworth
E. deo. W. Byrn

INVENTOR:
Miles Smith
BY
ATTORNEYS.

N. PETERS, PHOTO-LITHOGRAPHER, WASHINGTON, D. C.

UNITED STATES PATENT OFFICE.

MILES SMITH, OF SPRINGFIELD, VERMONT.

IMPROVEMENT IN SCYTHE-SNATH FASTENINGS.

Specification forming part of Letters Patent No. 189,275, dated April 3, 1877; application filed March 17, 1877.

*To all whom it may concern:*

Be it known that I, MILES SMITH, of Springfield, in the county of Windsor and State of Vermont, have invented a new and Improved Device for Fastening Scythe-Blades to the Snath; and I do hereby declare that the following is a full, clear, and exact description of the same, reference being had to the accompanying drawing, forming part of this specification, in which—

Figure 1:
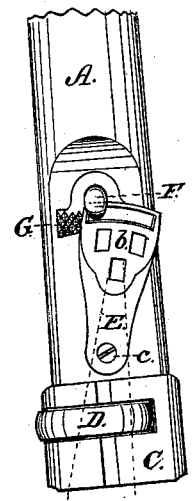
Figure 2:
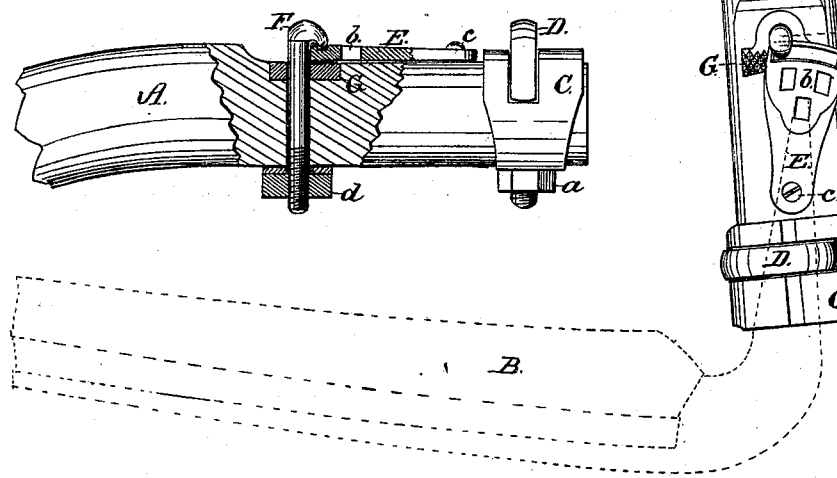
Figure 3:
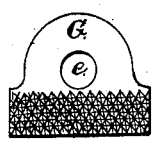
Figure 4:
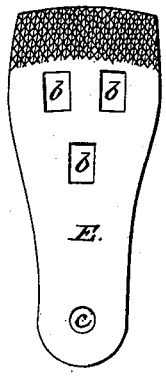

Figure 1 is a top view of the fastening, with the position of the scythe shown in dotted lines. Fig. 2 is a sectional view; Fig. 3, detail top view of plate G; Fig. 4, detail view of under side of swinging socket-plate.

My invention relates to an improvement upon the patent granted me January 16, 1877, for a similar invention, in which the right-angular shank of the scythe-blade was held by a stirrup and ferrule, while the projecting tang or toe was contained in a socket-plate arranged to swing, so as to give the desired adjustment to the scythe-blade for more or less of a shear-cut, and which socket was held to its adjustment by a hooked screw-bolt, whose hook engaged with a recess in the said swinging socket-plate.

The object of my present improvement is to provide means for more rigidly holding the socket-plate and the scythe-blade in their corresponding adjustments; to which end it consists in serrating, corrugating, ridging, or roughening the under surface of the free end of the socket-plate, and combining it with a plate upon the snath, having a corresponding roughened upper surface, which plate operates both as a bearing for the clamping-bolt and a clutch-plate for the swinging socket, to hold the latter in rigid position when the clamping-bolt is screwed up, as hereinafter more fully described.

In the drawing, A represents the lower end of the snath, to which the scythe-blade B (shown in dotted lines) is attached. C is a ferrule on the end of the snath, and D a stirrup, which, when screwed up by a nut, *a*, serves to clamp and hold the large end of the blade-shank, while the tang or toe at the extremity of the blade-shank enters one of the sockets *b* in the swinging socket-plate E, which plate is held at its free end in its adjustment about its pivot *c* by means of the hooked bolt F, which is clamped upon said socket-plate from the action of a screw-nut, *d*.

So far as described the devices do not differ substantially from those shown in my previous patent, referred to.

To obviate, however, any possible slip or displacement of the socket after being clamped, and the consequent loosening of the adjustment of the scythe, I form the underneath surface of the free end of the socket-plate with ridges, corrugations, teeth, serrations, projections, or other roughened surface, and locate in the snath a plate, G, having a corresponding roughened upper surface, upon which the roughened under surface of the socket-plate rests in its adjustments, and which roughened surfaces serve, when the parts are clamped by the bolt and its screw-nut, to clutch and hold the parts rigidly together against any accidental change in the adjustment.

The plate G is preferably inlaid or embedded in the wood of the snath, and is constructed with a perforation or eye, *e*, through which the shank of the hooked bolt passes, so that, in addition to its function as a clutch-plate for the swinging socket-plate, it also operates as a round bearing for the bolt, to prevent wear and form a more secure connection for the devices.

In defining more clearly my invention I would state that I do not limit the scope of my improvement to a bolt having a hooked head, as shown, as a bolt with a plain head might, under some modifications of the socket-plate, be equally as well employed.

Having thus described my invention, what I claim as new is—

1. The combination of the clamping-bolt, the swinging socket-plate, having a roughened under surface at its free end, and a plate arranged upon the snath, and having a roughened upper surface to clutch the swinging socket-plate from the action of the bolt, substantially as and for the purpose specified.

2. The plate G, having a roughened outer surface, and an opening, *e*, in combination with the swinging socket E, having a roughened under surface, and the clamp-bolt F, passing through the opening of the plate G, and arranged to clamp the parts, substantially as described.

MILES SMITH.

Witnesses:
WHEELOCK G. VEAZEY,
R. C. ABELL.